No. 856,648. PATENTED JUNE 11, 1907.
W. M. MILBURN.
ICE CREAM FREEZER.
APPLICATION FILED FEB. 23, 1906.

2 SHEETS—SHEET 1.

WITNESSES: William M. Milburn, INVENTOR.

By C. A. Snow & Co.
ATTORNEYS

No. 856,648. PATENTED JUNE 11, 1907.
W. M. MILBURN.
ICE CREAM FREEZER.
APPLICATION FILED FEB. 23, 1906.
2 SHEETS—SHEET 2.
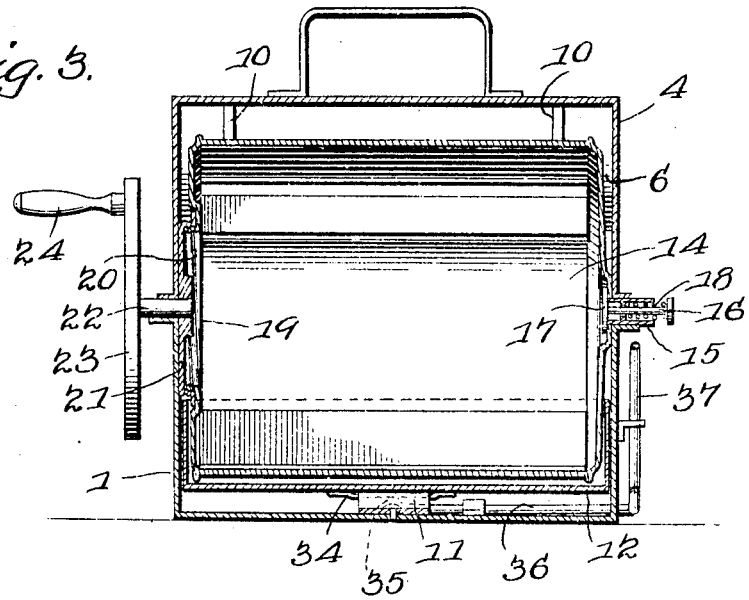
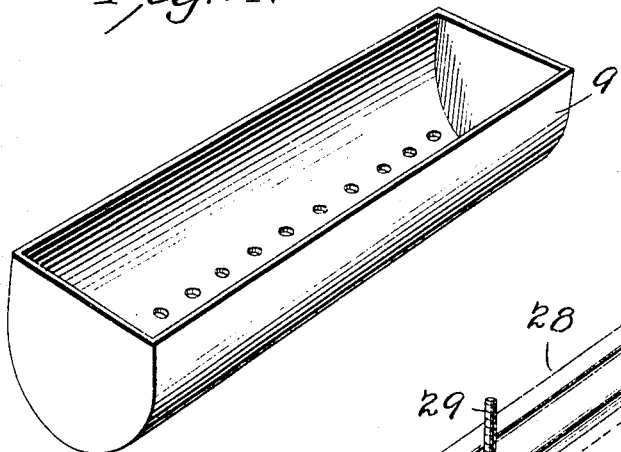
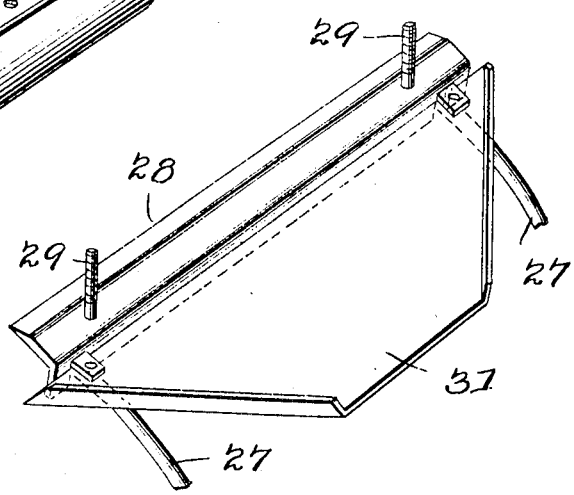
WITNESSES:
E. F. Stewart
Herbert D. Lawson
William M. Milburn, INVENTOR
By C. A. Snow & Co
ATTORNEYS

UNITED STATES PATENT OFFICE.

WILLIAM M. MILBURN, OF SHERMAN, TEXAS, ASSIGNOR OF ONE-THIRD TO D. H. BAILEY AND ONE-THIRD TO S. W. RUYLE, OF GRAYSON COUNTY, TEXAS.

ICE-CREAM FREEZER.

No. 856,648.   Specification of Letters Patent.   Patented June 11, 1907.

Application filed February 23, 1906. Serial No. 302,556.

*To all whom it may concern:*

Be it known that I, WILLIAM M. MILBURN, a citizen of the United States, residing at Sherman, in the county of Grayson and State of Texas, have invented a new and useful Ice-Cream Freezer, of which the following is a specification.

My invention relates to ice cream freezers, and its object is to provide a device of this character having a rotatable ice receptacle adapted to freeze cream as the same is applied to the outer surface of the receptacle.

A still further object is to provide means for removing the frozen cream and directing it into a receptacle provided for it.

A still further object is to employ novel means for feeding cream to the rotatable receptacle and for preventing the same from overflowing into the receptacle containing the frozen material.

With the above and other objects in view the invention consists of a rotatable cylinder in which ice, etc. is adapted to be placed, and this cylinder has a normally closed outlet whereby the same can be readily cleaned subsequent to use. The cylinder is mounted above a tray to which the cream is adapted to be supplied through a distributing trough located adjacent one end of the cover of the freezer and cylinders are disposed upon the rotatable ice receptacle for the purpose of holding the cream in proper position upon the ice receptacle during the freezing operation and to prevent it from overflowing into the receptacle containing the frozen cream.

The invention also consists of an adjustable knife which contacts with the outer surface of the ice receptacle and serves to remove therefrom the accumulated frozen cream and to direct it onto a chute which serves to convey it to a receptacle provided for the frozen cream.

The invention also consists of certain other novel features of construction and combination of parts, the preferred form of which will be hereinafter more fully described and pointed out in the claims.

In the accompanying drawings I have shown the preferred form of my invention.

Figure 1:
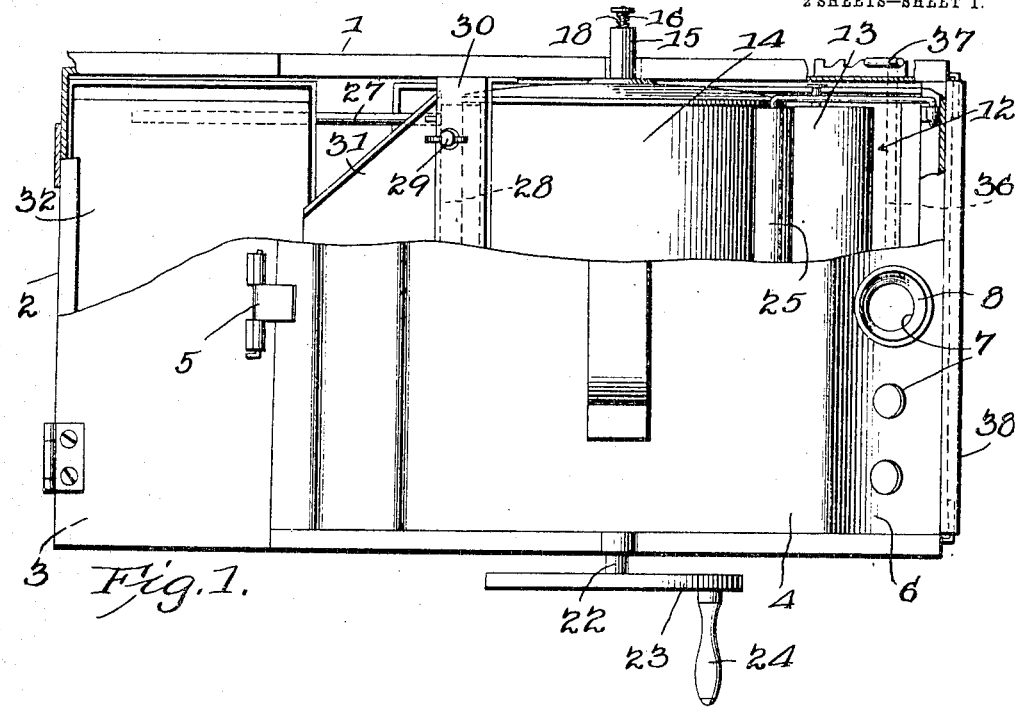
Figure 2:
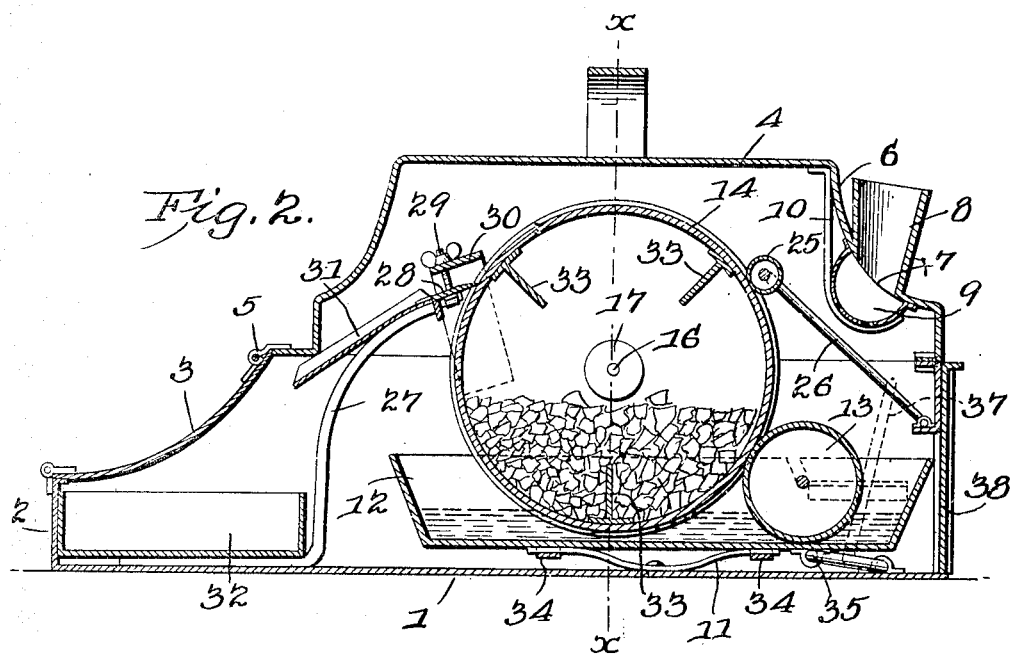

In said drawings,—Figure 1 is a plan view of the freezer, a portion of the cover being removed. Fig. 2 is a vertical longitudinal section through the freezer. Fig. 3 is a section on the line $x$—$x$ of Fig. 2. Fig. 4 is a detail view of the distributing trough detached, and Fig. 5 is a similar view of the combined knife and chute.

Referring to the figures by numerals of reference, 1 is a casing of any suitable contour and proportions, the forward portion 2 thereof being reduced in size and closed by a hinged lid 3. A cover 4 is hinged to the opposite end of casing 1, and extends over the entire casing up to the upper edge of the lid 3 and is provided with suitable means 5 whereby it may be secured to said lid so as to close the entire casing. The end of the cover 4 adjacent its hinges is concaved, as shown at 6, and has a series of openings 7 from one of which extends a funnel 8 which is adapted to direct cream into a perforated distributing trough 9 which is supported beneath the openings 7 by means of straps 10 which depend from the cover. The trough is removable from these straps by sliding it longitudinally and can, therefore, be conveniently detached for the purpose of cleaning.

Bow springs 11 are disposed upon the bottom of the casing 1 and support a pan 12 having a distributing cylinder 13 arranged therein adjacent one end. This cylinder extends from one side to the other of the pan and lies close to a large freezing cylinder 14 which extends into the pan 12. A tube 15 is located at one end of the cylinder 14 and constitutes a bearing therefor, said tube having a stem 16 therein provided with a head 17 which is held normally seated upon the inner end of the tube by means of a spring 18. Said head serves therefore to close the tube and prevent the escape therethrough of any of the contents of the cylinder 14. However, by pressing the stem inward this head 17 will be removed from the inner end of the tube 15 and the contents of the cylinder 14 can therefore be readily drained therethrough. The other end of the cylinder 14 has a large opening 19 surrounded by a threaded flange 20 which is adapted to be engaged by a screw cap 21 having a stem 22 projecting from it and constituting the other bearing of the cylinder 14. To this stem 22 is secured a disk 23 from which extends a grip or handle 24. It will of course be understood that the disk 23 can be dispensed with and instead a crank of the ordinary construction substituted therefor, and for the grip 24. However, when the disk 23 is utilized the same can be employed as a fly wheel for facilitating the rotation of cylinder 14. It will of course be understood that both the tube 15 and the stem 22 are journaled within opposite sides of the casing 1, and the cylinder 14 is of such proportions as to fit between the sides of the pan 12 and to project downward into said pan and close to the adjusting cylinder 13.

A small guard cylinder 25 is rotatably mounted between arms 26 which are pivoted within casing 1 adjacent one end thereof and this cylinder is normally supported by gravity upon the cylinder 14 at a point above the distributing trough 9 and serves to prevent cream from flowing over the freezing cylinder during its rapid rotation and before the cream has had a chance to freeze.

Located within the casing 1 near the lid 3 are spring arms 27 to which are secured the ends of a knife 28 which extends longitudinally of the cylinder 14 and contacts with the outer surface thereof. Thumb screws 29 extend from the ends of this knife through angular brackets 30 located upon the sides of the casing 1, and by manipulating these thumb screws the knife can be adjusted toward or away from the cylinder 14. A chute 31 extends from the knife 28 and converges toward its outlet. This chute is inclined and is adapted to discharge from its outlet any material which may be cut from the cylinder by the knife 28. The outlet of the chute is disposed above a receptacle 32 adapted to receive frozen cream. This receptacle is readily removable by opening the lid 3 and lifting the receptacle 32 from the forward reduced portion 2 of the casing 1. The cylinder 14 is provided upon its inner surface with longitudinally-disposed cleats or blades 33 which are utilized for the purpose hereinafter set forth.

In using the freezer herein described, the cylinder 14 is removed from the casing and the screw cap 21 is detached. A mixture of ice and salt is then placed within the cylinder and the cap is replaced. The cylinder is then reseated with its tube 15 and stem 22 in position upon the sides of the casing 1. The cover 4 and lid 3 are then fastened in closed position and cream is poured through the funnel 8 into the distributing trough 9. This trough will spread the cream over the cylinders 14 and 13 throughout their lengths and it will, of course, be understood that as soon as the cream comes in contact with the cylinder 14 a portion thereof will be frozen and will adhere thereto. The cylinder is now rotated in the direction of the knife 28 and the frozen cream will be carried thereby against the knife. This knife will cut or scrape the cream from the cylinder and direct it onto the chute 31 from which it will be discharged into the receptacle 32. That portion of the cream which fails to freeze as soon as discharged into the freezer will fall into the pan 12. As the cylinder 14 projects into this pan it will of course freeze that portion of the cream contacted thereby and therefore the accumulated cream will be gradually conveyed upward by the cylinder 14 to the knife 28. The cylinder 13 serves to distribute the cream evenly over the surface of the freezing cylinder, and the guard cylinder 25 is employed to prevent the cream from passing over the cylinder before it is frozen. This is liable to result should the cylinder be rotated very rapidly, but by providing the guard cylinder any danger of this character is obviated.

When it is desired to clean the cylinder 14 the same is removed from the casing and placed with its tubular bearing downward. The stem 16 is then pressed inward so as to remove its head from the inner end of the tube, and therefore the liquid contents of the cylinder will flow downward through the stem and by pouring water into the other end of the cylinder the same can be thoroughly cleaned. The blades or cleats 33 within the cylinder 14 are provided to compel the contents of the cylinder to rotate therewith, thereby insuring a practically even temperature of all portions of the surfaces of the cylinder and rendering said cylinder more easy to rotate.

The pan 12 is preferably provided upon its bottom with straps 34 which embrace the ends of springs 11 to prevent displacement of the pan. A shaft 35 having an angular extension 36 at one end is journaled upon the bottom of the casing 1 and beneath that end of the pan 12 in which cylinder 13 is mounted. This shaft extends through one side of casing 1, and terminates in a lever 37 whereby the shaft can be manually operated to turn the extension 36, and positively raise the pan 12 and cylinder 13.

The pan 12 can be readily reached through the rear end of the casing which is normally closed by a sliding door 38.

A freezer such as herein described can be constructed at comparatively slight cost and by reason of the fact that the cream is distributed over the freezing cylinder in a thin sheet the operation of freezing a quantity of cream is rendered very rapid and thorough.

Having thus described the invention, what is claimed is:—

In a freezer the combination with a casing; of a yieldingly supported receptacle therein, manually operated means engaging the receptacle for tilting the same, a distributing cylinder journaled within the receptacle, an ice containing cylinder rotatably mounted within the casing and projecting into said receptacle and against the distributing cylinder, a knife adjustably mounted adjacent, and bearing upon, the ice containing cylinder for removing frozen material therefrom, a chute extending from and adjustable with said knife, a receptacle within the casing for receiving material from the chute, and a rotatable guard seated by gravity upon and extending longitudinally of the ice containing cylinder at a point between and above the distributing cylinder and the knife.

In testimony that I claim the foregoing as my own, I have hereto affixed my signature in the presence of two witnesses.

WILLIAM M. MILBURN.

Witnesses:
T. M. SNYDER,
M. W. JONES.